United States Patent Office 3,843,375
Patented Oct. 22, 1974

3,843,375
CERAMIC COMPOSITIONS AND PROCESS OF MAKING SAME
Yorihiro Murata, North Tonawanda, N.Y., assignor to The Carborundum Company, Niagara Falls, N.Y.
No Drawing. Continuation of application Ser. No. 241,520, Apr. 6, 1972, which is a continuation of application Ser. No. 27,117, Apr. 9, 1970, both now abandoned. This application Oct. 15, 1973, Ser. No. 406,742
Int. Cl. C04b 35/70, 35/56
U.S. Cl. 106—43     4 Claims

ABSTRACT OF THE DISCLOSURE

Hard, wear-resistant compositions particularly suitable for cutting tool tips may be prepared by hot pressing a mixture consisting essentially of from about 39% to about 58.5% TaN, from about 26% to about 39% $ZrB_2$, and from about 2.5% to about 35% of an additive selected from the group consisting of TaC, ZrN, $TaB_2$, $NbB_2$ and WC, the proportion of TaN to $ZrB_2$ being about 60:40.

---

This is a continuation of copending application Ser. No. 241,520, filed Apr. 6, 1972, which is in turn a continuation of application Ser. No. 27,117, filed Apr. 9, 1970, both now abandoned.

BACKGROUND OF THE INVENTION

The present invention relates to new and useful ceramic compositions, and more particularly to ceramic compositions useful for the fabrication of cutting tool tips and the like. The invention further relates to such cutting tool tips and other hard, wear-resistant articles, and to processes for the production of the aforesaid compositions, cutting tool tips and other articles.

In recent years many new superalloys and refractory metals have been introduced having properties which render them of great interest in various fields such as the manufacture of aircraft and space vehicles. The high strength of such metals and alloys results in a problem of greatly reduced machinability which imposes severe limitations on the fabrication of parts from such materials. Machining rates for these materials are often substantially less than those for the more conventional older steels. A number of types of cutting materials have heretofore been available. These include various hard metals and alloys, cermets such as tungsten carbide bonded by cobalt, and ceramic materials such as sintered or hot pressed alumina. For certain machining applications, the ceramic types of cutting materials are generally regarded as superior to the other types with respect to such factors as abrasion and corrosion resistance, machining speed, quality of finish of the work material, and ability to withstand high tool tip temperatures. However, some of the newer types of metals and alloys are so difficult to machine with cutting materials heretofore available that there is a clear-cut need for harder and more durable materials such as are used for cutting tool tips.

U.S. Pat. No. 3,305,374 discloses superior hard, wear-resistant compositions which are very suitable for cutting tool tips, as well as for other hard, wear-resistant articles. In accordance with the aforesaid patent, such compositions are produced by hot pressing an initial mixture consisting of about 40–80% tantalum mononitride (TaN) and about 20–60% zirconium diboride ($ZrB_2$). Within the ranges specified, the preferred composition is produced by hot pressing a mixture of TaN and $ZrB_2$ in the proportion of about 60:40.

SUMMARY OF THE INVENTION

Notwithstanding the highly desirable properties of the aforesaid hot pressed 60:40 TaN-$ZrB_2$ composition, it has now been found that hard, wear-resistant compositions useful for the fabrication of various articles, especially cutting tool tips, may be produced by hot pressing an initial mixture consisting essentially of (1) TaN and $ZrB_2$ in the proportion of about 60:40, and (2) an additive selected from the group of refractory carbides, borides and nitrides consisting of tantalum carbide (TaC), zirconium nitride (ZrN), tantalum diboride ($TaB_2$), niobium diboride ($NbB_2$) and tungsten carbide (WC). It has further been found that, in many instances, the presence of the additive results in the production of a hot pressed composition which is unexpectedly superior to the 60:40 TaN-$ZrB_2$ composition in actual cutting performance tests. Also, it has been found that, in most instances, the presence of the additive results in a hot pressed composition which is superior to the 60:40 TaN-$ZrB_2$ composition in respect of one or more mechanical properties such as hardness, relative density and modulus of rupture.

It is therefore an object of this invention to produce compositions of great hardness, wear-resistance, and durability. It is a further object of this invention to produce cutting tool tips and other hard, wear-resistant articles composed of such compositions. It is also an object of this invention to provide processes for producing such compositions, and for fabricating such cutting tool tips and other hard, wear-resistant articles. It is a further object of this invention to provide new cutting materials which make it possible to achieve acceptable machining rates in the fabrication of parts from difficulty machinable metals. It is still a further object of this invention to produce hard, wear-resistant compositions, useful for the fabrication of cutting tool tips and other articles, which compositions are superior to the 60:40 TaN-$ZrB_2$ composition of the prior art in respect of cutting performance and/or one or more mechanical properties.

In essence, the various objects of this invention are achieved by hot pressing an intimate mixture consisting essentially of (1) from about 39% to about 58.5% TaN and from about 26% to about 39% $ZrB_2$, the TaN and $ZrB_2$ being present in the proportion of about 60:40, and (2) from about 2.5% to about 35% of an additive selected from the group consisting of TaC, ZrN, $TaB_2$, $NbB_2$ and WC. As a result of hot pressing the mixture, the characteristics of the initial mixture are changed and an extremely hard, dense and durable composition is produced which is eminently suited to use in cutting tool tips and other hard, wear-resistant articles.

As will become more apparent from the following description, the intimate mixture of TaN, $ZrB_2$ and the additive may either be hot pressed in a mold which is of suitable design to produce a cutting tool tip or other article directly, or alternatively, the mixture may be hot pressed in a mold which is designed to form a slug from which the desired article can be fabricated by conventional means. In general, it is economically preferable to form the desired article in the first instance, thereby eliminating the intermediate step whereby the composition is first formed as a slug from which the article may be fabricated. On the other hand, however, it may at times be preferred to form the composition as a slug first as, for example, when a mold of the shape desired for the final article is unavailable or where an article of a particularly intricate shape is required.

It has been found that the precise amount of the additive incorporated in the initial mixture to be hot pressed is quite critical with respect to obtaining the desired characteristics in the hot pressed composition. Specifically, in order to produce a hot pressed composition according to the invention which gives desirable cutting tool tip from the standpoint of durability in use, and especially if it is sought to produce a hot pressed composition superior to the 60:40 TaN-ZrB$_2$ composition of the prior art, the initial mixture or raw batch must contain from about 2.5% to about 35% of the additive. Preferably, in order to produce cutting tool tips of maximum durability according to the invention, the initial mixture should contain from about 5% to about 20% of the additive, in which case the mixture will also contain from about 48% to about 57% TaN and from about 32% to about 38% ZrB$_2$, the TaN and ZrB$_2$ being present in the proportion of about 60:40.

In order to impart optimum properties to the hot pressed composition, the ingredients used to prepare the initial mixture should be finely divided, preferably having a maximum particle size of about 45 microns and still more preferably about 10 microns.

In order to produce a hot pressed composition of suitable quality, it is important that the finely divided powders be intimately mixed. For the purposes of the invention, the intimate mixture may be obtained by any convenient means. However, the following procedure has been found to be desirable. The ingredients are placed in a ball mill with a sufficient volume of a suitable liquid to form a thick slurry, and the mill is rotated to obtain the desired mixing, following which the mixture is dried. In view of the abrasive nature of the ingredients, it is preferred to use a rubber lined ball mill, and the balls should be of some hard material such as stainless steel or tungsten carbide bonded by cobalt. The liquid selected for the purpose should be such as will not affect the rubber lining of the ball mill, and it should preferably be relatively volatile. Among the liquids found suitable are ethanol and methanol. Rotation of the ball mill for about 30 minutes or less usually suffices to give the desired intimate intermingling of the ingredients, and unnecessarily long periods should be avoided to minimize contamination resulting from the abrasive action of the ingredients on the balls. The drying step may be carried out in any convenient manner but preferably is conducted at a temperature of less than about 110° C., since higher temperatures may tend to result in undesirable agglomeration of the mixture. A warm air oven or a vacuum drier may conveniently be used.

The hot pressing step may be carried out in any of a variety of conventional type molds known in the art, such as graphite molds. As noted above, the mold may be of a design suitable for the formation of a cutting tool tip of the desired shape, e.g., square, diamond-shaped, triangular, etc., or to form any other desired article. Alternatively, the mold may be of such design as to produce a slug from which such articles may subsequently be fabricated. After placing the initial mixture in the mold it is desirable, though not essential, to apply vibration to the mold in order to facilitate the settling of the particles to achieve more uniform packing and to level the surface of the powder to give a layer of fairly uniform thickness.

Essentially, the hot pressing step consists of subjecting the intimately mixed ingredients to pressure at an elevated temperature. Although the precise means of achieving these conditions is not critical, it is generally convenient to proceed as follows. The mold, containing the mixture, is placed in a closed container which is disposed within the coil of a high-frequency induction furnace, and while the mixture in the mold is heated to about 2100° C. it is subjected to pressure by means of a plunger passing through the lid of the container that transmits pressure from a suitable device such as a pressure cylinder. In order to protect the mold from oxidation, especially if a graphite mold is employed, it is desirable to carry out the hot pressing in a non-oxidizing atmosphere. A continuous stream of nitrogen or other inert gas may be introduced into the container before starting the heating, to replace the air and maintain an inert atmosphere, or the container may be evacuated.

DESCRIPTION OF THE PREFERRED EMBODIMENTS

Example I—Preparation of Prior Art Composition from 60% TaN–40% ZrB$_2$

To a raw batch composed of 120 g. of finely divided TaN and 80 g. of finely divided ZrB$_2$, sufficient ethyl alcohol is added to form a thick slurry. The slurry is poured into a rubber lined ball mill having a length of approximately 6.5 cm. and an inside diameter of approximately 10 cm., the mill previously having been filled to about one-quarter of its capacity with stainless steel balls ranging from approximately 1 to approximately 1.5 cm. in diameter. Milling is carried on for about 30 minutes, after which the mixture is dried in a hot air oven at 85° C. After removal of the stainless steel balls by means of a coarse sieve, the mixture is ready for hot pressing.

A graphite mold approximately 15 cm. high having an outer diameter of approximately 7.5 cm. and a compression chamber approximately 2.5 cm. in diameter with fitting plungers is employed for the hot pressing. A 29.7 g. portion of the above mixture is placed in the mold, which is then placed on a vibrating table to settle and level its contents. The mold is placed in a container which is disposed within the coil of a high frequency induction furnace, and the container is covered with a lid. A pressure of about 185 kg./cm.$^2$ is applied and maintained on the mold plungers. A stream of nitrogen is introduced continuously into the container through a port therein, the atmosphere of the container being vented through a second port in the container. The power is turned on and the temperature is allowed to reach 2100° C. as measured by an optical pyrometer. This requires about 45 minutes. This temperature is held substantially constant for 30 minutes, whereupon the pressure is released and the power is shut off. The nitrogen stream is continued and the system is permitted to cool to about room temperature, about 5 hours being required. The hot pressed body is ejected from the mold and polished by means of a diamond grinding disc.

The body formed by the foregoing steps is a round slug measuring approximately 2.5 cm. in diameter by approximately 0.6 cm. in thickness.

A cutting tool tip is fabricated from the slug by utilizing conventional means to grind and polish the slug to a thickness of approximately 0.475 cm. and form a square having sides approximately 1.27 cm. long and corners rounded to a radius of approximately 0.16 cm. These dimensions are established within sufficiently close tolerance as to permit an accurate comparison of the tip in cutting tests.

Examples 2–15—Preparation and Properties of Compositions According to the Invention In substantial accordance with the procedures of Example 1, slugs of different compositions according to the invention are prepared by hot pressing mixtures consisting of the desired proportions of TaN, ZrB$_2$ and the selected additive, and cutting tool tips are fabricated from the slugs. In each case, the TaN and ZrB$_2$ are present in the raw batch in the proportion of 60:40. Table I indicates the percentage composition of each raw batch, and the amount of raw batch used to form a slug approximately 0.6 cm. thick and approximately 2.5 cm. in diameter. Table I further sets forth the relative density, modulus of rupture, and hardness on the Rockwell N15 scale of the hot pressed compositions so produced, and indicates the performance of cutting tool tips formed therefrom, which data are discussed at greater length hereinafter. Data on the composition and cutting tool tip of Example 1 are also set forth in Table I for comparison.

TABLE I

| Example number | Composition of raw batch | | | Grams of raw batch, per slug | Relative density, percent | Modulus of rupture (kg./cm.²) | Hardness (Rockwell N15) | Tool tip life (minutes) | |
|---|---|---|---|---|---|---|---|---|---|
| | Additive, percent | TaN, percent | ZrB₂, percent | | | | | AISI 4140 steel (R_c 29-33) | AISI 4340 steel (R_c 39-42) |
| 1 | | 60 | 40 | 29.7 | 98.6 | 3,510 | 95.5 | 17.2 | 21.4 |
| 2 | ZrN, 2.5 | 58.5 | 39 | 29.5 | 99.0 | 3,800 | 95.6 | | 10.1 |
| 3 | ZrN, 5 | 57 | 38 | 29.4 | 99.4 | 3,950 | 95.7 | 23.8 | 13.3 |
| 4 | ZrN, 10 | 54 | 36 | 29.0 | 99.5 | 3,960 | 95.6 | | |
| 5 | ZrN, 20 | 48 | 32 | 28.3 | 99.9 | 4,080 | 96.5 | | 28.8 |
| 6 | NbB₂, 5 | 57 | 38 | 29.3 | 97.5 | 3,330 | 95.9 | 22.8 | 9.2 |
| 7 | NbB₂, 20 | 48 | 32 | 28.2 | 95.6 | 3,420 | 95.8 | | 10.8 |
| 8 | WC, 5 | 57 | 38 | 30.4 | 97.3 | 3,240 | 95.3 | 20.0 | 10.1 |
| 9 | WC, 20 | 48 | 32 | 32.2 | 101.7 | 4,290 | 96.2 | | 33.0 |
| 10 | TaB₂, 2.5 | 58.5 | 39 | 29.9 | 97.1 | 3,450 | 95.5 | | 12.4 |
| 11 | TaB₂, 5 | 57 | 38 | 30.0 | 99.7 | 3,330 | 95.9 | 23.2 | 12.4 |
| 12 | TaB₂, 10 | 54 | 36 | 30.4 | 98.2 | 3,560 | 96.0 | | 13.0 |
| 13 | TaB₂, 20 | 48 | 32 | 31.1 | 102.0 | 3,870 | 96.3 | | 19.3 |
| 14 | TaC, 5 | 57 | 38 | 30.3 | 97.5 | 3,740 | 96.2 | 25.2 | |
| 15 | TaC, 20 | 48 | 32 | 32.0 | 98.1 | 3,890 | 96.5 | | 18.3 |

In carrying out the present invention the temperature should be sufficiently high during hot pressing to permit densification, under the influence of pressure, to a relative density (i.e., actual density/theoretical density expressed as percent) of the order of 95% or more. On the other hand, an unnecessarily high temperature should be avoided, since excessive temperatures tend to result in the formation of large grains which in turn are adverse to durability and wear-resistance in the hot pressed composition. In general, hot pressing temperatures in the range from about 1800° C. to about 2250° C may be used, and at a pressure of about 185 kg./cm.², a temperature of about 2100° C. is sufficiently high to achieve the desired densification without unduly large grain size.

As is well known, the pressure employed in hot pressing operations is also an important factor. Although maximum pressures are not critical the minimum pressure used must, of course, be such as to obtain the required degree of densification at the prevailing temperature during the heating time employed. In the present case a pressure of at least about 125 kg./cm.² is preferred although under favorable conditions pressures as low as about 70 kg./cm.² may be used. More particularly a pressure within the range from about 140 to about 210 kg./cm.² is preferred. Higher pressures may be used but there appears to be no advantage in general to the use of pressures above about 350 kg./cm.².

The time during which the composition is maintained under maximum temperature and the desired pressure conditions should be sufficiently long to permit virtually maximum densification. Densification curves, i.e., relative density plotted as a function of time at specific temperature and pressure, have been ascertained precisely by using special apparatus attached to the furnace. These curves indicate that, for raw batches of the range of proportions contemplated by this invention, the point of virtually maximum densification is usually reached within about 30 minutes after maximum temperature is reached. Longer periods may be employed, but unnecessarily long periods should be avoided since other properties of the hot pressed composition, such as grain size, may be adversely affected.

It is generally known that there is some degree of interrelationship between the temperature, pressure and time of hot pressing. Thus as lower pressures are employed, somewhat longer periods of time may be required in order to achieve the desired degree of densification. However, as noted above, unduly prolonged time periods at the temperature used for hot pressing may tend to result in larger grain size, and it will therefore generally be preferred to employ a sufficiently high pressure to achieve densification in a relatively short time. Likewise, the higher temperatures in the range specified will usually be preferred inasmuch as densification will then tend to occur more rapidly at any given pressure.

After virtually maximum densification has been achieved under the foregoing conditions, the composition is permitted to cool. As in Example 1, the pressure may be released at the outset of the cooling process. It may, however, optionally be maintained until any convenient point in the cooling stage. While the cooling stage required about 5 hours in Example 1, it should be noted that the rate of temperature decrease will ordinarily become slower as the temperature becomes lower, and that the rapid rate of cooling at the beginning of the cooling stage is highly desirable. More particularly, it is preferred that the temperature drop to the range of about 1200–1300° C. within the first hour or less. Rapid cooling to this point minimizes the possibility of undesirable changes in the hot pressed composition, particularly since rapid cooling tends to retain a small grain size which in turn favors a high modulus of rupture and great hardness in the hot pressed body. Once the temperature has been reduced to about 1200–1300° C., however, no significant further change of grain size occurs, and accordingly further cooling may proceed leisurely. When the temperature approaches room temperature, the body may be ejected from the mold. It is generally preferred to grind the surfaces of the hot pressed body by means of a diamond grinding disc or other conventional means, in order to polish the surfaces and remove any particles which may adhere from the graphite mold.

As noted above, the characteristics of the raw batch undergo substantial chemical and physical changes, including densification and solid solution formation, during hot pressing. While the general nature of certain of these changes can be ascertained to some extent, it is virtually impossible with presently available means to characterize completely the composition of the hot pressed bodies. For example, phase analyses by X-ray powder diffractometry using monochromatic copper K-alpha radiation were carried out on compositions produced according to the invention with various amounts of ZrN as the additive. The results indicated that all such compositions were composed of at least four phases, viz, a ZrN phase, a TaB phase, a Ta₃B₄ phase, and a ZrB₂ type solid solution phase. Likewise, X-ray analysis of compositions wherein the additive was WC indicated the presence of at least three phases, viz, a ZrN phase, a TaB phase, and a ZrB₂ type solid solution phase. Small amounts of one or more unidentifiable phases may also have been present. However, there is no practical means of ascertaining the precise composition of the phases discerned by X-ray analysis, or of ascertaining the precise proportions of the various phases, thus even apart from the unidentifiable phases which may be present, a meaningful definition of the hot pressed compositions is virtually impossible. Moreover, the phase composition of the hot pressed bodies varies considerably with the particular additive selected and with the proportion of any given additive in the raw batch.

In general, however, it may be said that useful articles may be made according to the invention from raw batches containing up to about 35% of a specified additive which are extremely tough, durable and wear-resistant, demonstrating these properties even at high temperatures. Referring to Table I above, it may be seen that the relative density of the compositions of the invention is above 95% in all cases. In all cases, the modulus of rupture is greater than 3200 kg./cm.² and the hardness on the Rockwell N15 scale is greater than 95.0. As a result of these highly desirable properties, it will be apparent that the compositions of the inveniton will find utility not only in cutting tool tips but also for various other applications where such properties are required, such as the manufacture of extrusion dies and wear-resistant inserts. It should particularly be noted, with reference to Table I, that almost every composition according to the invention reported there is superior in at least one mechanical property to the prior art composition of Example 1.

The results of comparative cutting performance tests on cutting tool tips prepared according to Examples 1 and 2–15 are reported in the last two columns of Table I. Considering the last column, the work material employed was AISI 4340 steel having a Rockwell C hardness of 39–42. Constant conditions of tool geometry were adhered to. No cutting fluid was used. The tool life end point in each case was taken to be the point in time at which the tip showed a wearland width of 0.38 mm. The rate of feed per revolution of the work material was 0.13 mm. and the depth of cut was 1.27 mm. The cutting speed i.e., the speed at which a point on the surface of the work material travels as the work material revolves against the tool tip, was 800 feet per minute (244 meters per minute). It is evident that all of the tool tips tested performed quite acceptably, and they are vastly superior to tips fabricated from such conventional materials as hot pressed alumina and cobalt-bonded tungsten carbide. It should particularly be noted that tool tips prepared from raw batches containing 20% ZrN and 20% WC are markedly superior to the 60:40 TaN-ZrB₂ tool tip of Example 1.

Considering the penultimate column of Table I, the work material employed was AISI 4140 steel having a Rockwell C hardness of 29–33. Again, constant conditions of tool geometry were adhered to, no cutting fluid was used, and the tool life and point was taken to be the point in time at which the tip showed a wearland width of 0.38 mm. The rate of feed per revolution of the work material was 0.396 mm., the depth of cut was 1.27 mm., and the cutting speed was 600 feet per minute (183 meters per minute). It is apparent that the presence of an additive according to the invention in an amount of 5% results in a cutting tool tip which is clearly superior to the tool tip of Example 1.

Except as otherwise indicated, percentages, parts and proportions specified herein are percentages, parts and proportions by weight.

Modulus of rupture values were measured at room temperature by a standard three-point loading method, with specimens 2.4 x 0.6 x 0.3 cm. and a span of 2.2 cm., each specimen being prepared so that its longitudinal axis was perpendicular to the direction of hot pressing. Hardness on the Rockwell N15 scale was determined conventionally, at room temperature, the reported values being an average of twelve measurements.

While the invention has been described herein with reference to certain examples and preferred embodiments, it is to be understood that various changes and modifications may be made by those skilled in the art without departing from the concept of the invention, the scope of which is to be determined by reference to the following claims.

I claim:

1. A composition of matter made by hot pressing at a temperature in the range from about 1800° C. to about 2250° C. and at a pressure of at least about 70 kg./cm.², an intimate mixture consisting essentially of, by weight, about 48% TaN, 32% ZrB₂ and 20% of an additive selected from the group consisting of ZrN and WC.

2. A cutting tool tip formed from a hot pressed composition as set forth in claim 1.

3. A cutting tool tip as set forth in claim 2 wherein said additive is ZrN.

4. A cutting tool tip as set forth in claim 2 wherein said additive is WC.

References Cited
UNITED STATES PATENTS

| | | | |
|---|---|---|---|
| 3,305,374 | 2/1967 | Murata et al. | 106—57 |
| 3,669,695 | 6/1972 | Iler | 106—43 |
| 3,409,416 | 11/1968 | Yates | 51—307 X |

HELEN M. McCARTHY, Primary Examiner

U.S. Cl. X.R.

29—182.5; 51—307; 106—57